United States Patent

[11] 3,548,100

[72] Inventor James M. Loe
Willow Grove, Pa.

[21] Appl. No. 700,544
[22] Filed Jan. 25, 1968
[45] Patented Dec. 15, 1970
[73] Assignee Philco Ford Corporation
Philadelphia, Pa.
a corporation of Delaware

[54] FORMANT FREQUENCY EXTRACTOR

5 Claims, 6 Drawing Figs.

[52] U.S. Cl. .......... 179/1
[51] Int. Cl. .......... G10l 1/00
[50] Field of Search .......... 179/1(AS); 325/427; 333/17, 76, 70; 324/77

[56] References Cited

UNITED STATES PATENTS

| | | | |
|---|---|---|---|
| 2,859,405 | 11/1958 | Feldman et al. .......... | 179/1(AS) |
| 3,376,387 | 4/1968 | Lassel .......... | 179/1(AS) |

*Primary Examiner*—Kathleen H. Claffy
*Assistant Examiner*—Jon Bradford Leahecy
*Attorney*—Robert D. Sanborn

ABSTRACT: A formant frequency extractor comprising the tandem combination of a fixed band-pass filter, a tunable low-pass filter, a tunable high pass filter, and a frequency meter which controls the tunable filters, and a frequency unselective path, typically comprising a resistor connected in shunt with the tunable filters, for adding to the signal transmitted by the tunable filters a portion of the signal transmitted thereto by the fixed band-pass filter. The shunt combination of the tunable filters and the frequency unselective path possesses a relatively flat passband characteristic which contains a peak at a frequency determined by the tuning of the tunable filters. The frequency meter produces an output signal which is determined by the frequency of the highest amplitude component of the composite input signal supplied thereto by the tunable filters and frequency unselective path and which controls the tuning of the tunable filters. Consequently the frequency extractor exhibits frequency domain hysteresis in an amount dependent on the value of the resistor.

PATENTED DEC 15 1970 3,548,100

RESPONSE AT POINT "A" OF FIG. 1.

INVENTOR.
JAMES M. LOE
BY
Leonard Zalman
ATTORNEY

FORMANT FREQUENCY EXTRACTOR

The human speech wave may be characterized at any instant by a series of harmonics of the basic pitch frequency. The envelope of the amplitudes of these harmonics tends to peak at different points in the frequency spectrum depending on the sound being uttered at the moment. The frequencies of these peaks are referred to as the speech formants. Signals representative of the frequencies of these formants are used in several narrow-band speech communication and control systems, such as the formant vocoder.

In practice it is often more convenient and sufficiently precise to generate a signal representative of a particular formant by tracking the frequency of the pitch harmonic nearest the peak of the envelope, which will be the harmonic of largest amplitude in the vicinity of the peak, rather than tracking the frequency of the actual peak of the envelope. Since the peak of the envelope often falls between adjacent pitch harmonics, small and unimportant shifts in the frequency of the peak may cause adjacent pitch frequency harmonics to alternate as the harmonic of largest amplitude. In systems which select the harmonic of largest amplitude this often results in abrupt jumping between adjacent harmonics whenever the amplitude of the peak of the envelope shifts. These shifts between adjacent harmonics of nearly the same amplitude are not necessary to the synthesis of a realistic speech wave and produce a noisy frequency parameter signal.

It is therefore an object of the present invention to improve the quality of the frequency parameter signal generated by a formant frequency extractor.

It is a further object of the present invention to provide a formant frequency extractor that is insensitive to insignificant changes in formant location as reflected by the amplitudes of pitch harmonics.

In accordance with the present invention, hysteresis is provided in the formant frequency extractor tracking loop. This hysteresis makes the extractor insensitive to insignificant changes in formant position whereby it can produce the noise-free frequency parameter signal which is necessary for good speech synthesis.

In a preferred embodiment of the present invention, the formant frequency extractor comprises the parallel combination of a variable band-pass filter and a resistor, in cascade with a fixed band-pass filter and a frequency meter. This combination produces a DC voltage output approximately representative of the formant frequency. This formant frequency parameter signal is fed back to the variable band-pass filter to position its center frequency at a point near the formant frequency. The value of the resistor is chosen so that about 6 db. preemphasis is provided at the center frequency of the variable band-pass filter. This preemphasis assures that the system will track only significant changes in formant location.

For a better understanding of the present invention together with other and further objects thereof reference should now be had to the following detailed description which is to be read in conjunction with the accompanying drawings in which.

Figure 1:
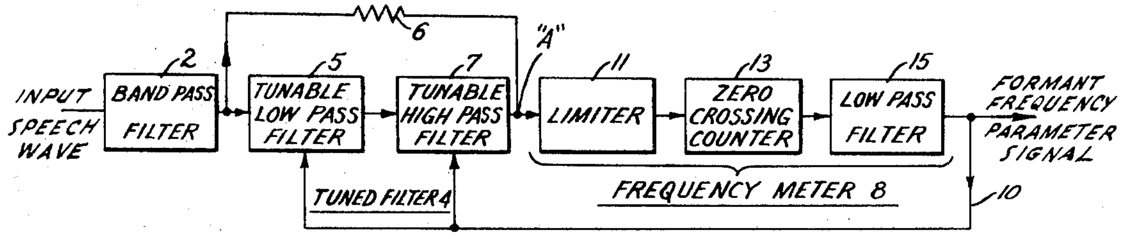
FIG. 1 is a block diagram of a formant frequency extractor in accordance with the present invention.
Figure 2:
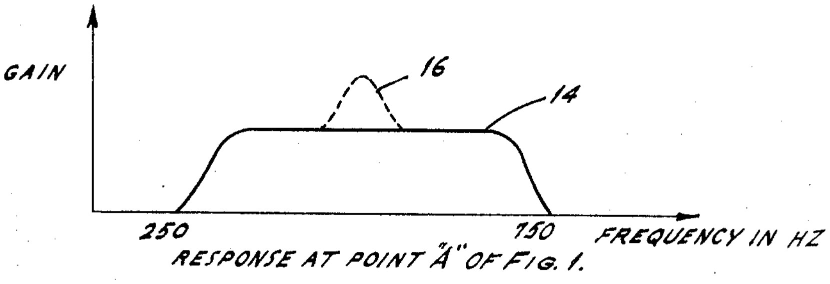
FIG. 2 is a graph showing the frequency response at point A in the block diagram of FIG. 1.
Figure 3A:
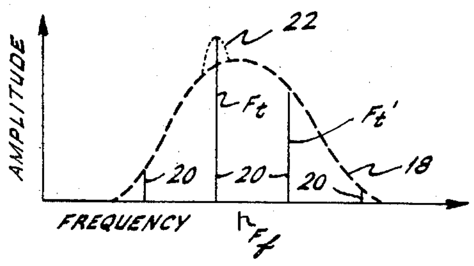
FIG. 3*a*—3*d* are graphs illustrating the effect of formant frequency shifts on the operation of the system.
Figure 3B:
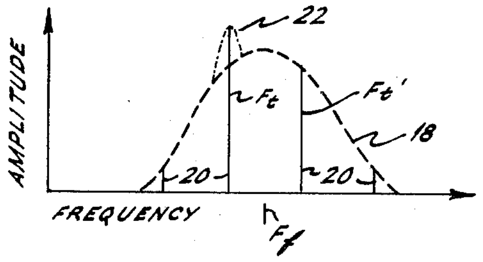
Figure 3C:
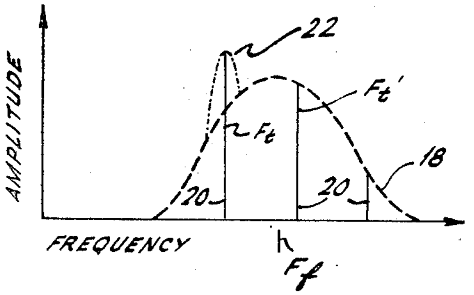
Figure 3D:
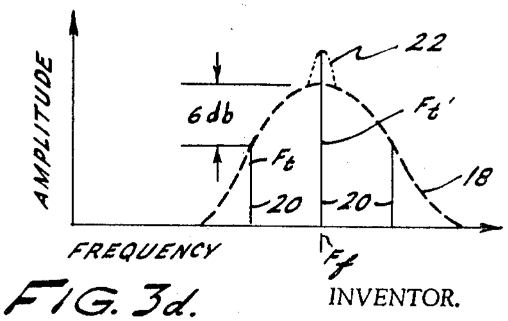

Referring now to the drawings, FIG. 1 shows a block diagram of a formant frequency extractor and tracking loop for tracking the first formant, i.e. the lowest frequency formant, of a sound. An electrical representation of a speech wave, such as produced by a standard high quality microphone (not shown) is supplied to a band-pass filter 2. The response of this filter is shown in FIG. 2 by the solid line 14. The output of filter 2 is supplied to an active voltage-tuned filter 4 which provides preemphasis in a portion of the band-pass of filter 2 as shown by the dotted line 16 in FIG. 2.

Tuned filter 4 may comprise a conventional tunable resistor-capacitor high pass filter 5 and a conventional tunable resistor-capacitor low pass filter 7 connected in tandem. The resistor portion of each of filters 5 and 7 may comprise a field effect transistor having a resistance determined by the DC voltage supplied to the gate electrode thereof. The change in resistance with change in gate voltage should be sufficient to permit the peak represented by dotted curve 16 to be shifted over a substantial portion of the passband of filter 2 as represented by solid line 14 in FIG. 2.

Filter 4 is bypassed by a resistor 6. Thus the signal at point A is a combination of the signal passed by filter 2 and the signal passed by filter 4. The relative amplitudes of these two components in the combined signal at point A will depend upon the impedance of resistor 6 compared to the transfer impedance of filter 4. That is, the amplitude of the peak in the combined frequency response of filters 2 and 4 compared to the plateau represented by line 14 can be adjusted by changing the value of resistor 6 or the overall transfer impedance of filter 4. The combined signal at point A is then analyzed by a frequency meter 8 which produces a DC voltage output representative of the frequency of the harmonic of maximum amplitude at point A. A suitable frequency meter for use in the system of the present invention is described in U.S. Pat No. 2,859,405, issued to Feldman et al. on Nov. 4, 1958, and entitled "Derivation of Vocoder Pitch Signals." The circuit disclosed by Feldman (not shown in the drawings), comprises the tandem combination of a limiter, a monostable multivibrator, and a low pass filter, connected in the order named. Another commonly used frequency meter circuit which will produce the equivalent effect is the tandem combination of a limiter 11, a zero-crossing counter 13, and a low pass filter 15.

An output signal of meter 8 is fed back to the tuned filter 4 by connection 10 to position the passband of filter 4 at the frequency of this measured harmonic. This positioning of filter 4 at the frequency of the measured harmonic produces preemphasis of the largest spectral line of the formant, that is, preemphasis of the spectral line nearest to the formant frequency over other spectral lines passed by filter 2. The magnitude of this preemphasis is controlled by the magnitude of resistor 6. If further control is desired, a resistor may be connected in series with variable filter 4 to control the effective transfer impedance of filter 4. A preemphasis of about 6 db. is preferred.

Because of the preemphasis produced by tuned filter 4 and resistor 6, the formant frequency extractor exhibits hysteresis in the frequency domain. This hysteresis makes the extractor insensitive to slight changes in amplitude of the tracked harmonic resulting from slight changes in the formant frequency and thus the extractor produces a substantially noise-free formant frequency parameter signal. The frequency meter 8 will shift from one harmonic of the pitch frequency to an adjacent harmonic only when the difference in the amplitudes of these harmonics at the input of filter 2 exceeds approximately 6db.

FIG. 3 illustrates the manner in which the extractor produces a noise-free formant frequency parameter signal. In FIG. 3*a* the dashed line 18 represents the frequency envelope or formant of a sound at the input speech terminal, the solid lines 20 represent spectral lines (pitch harmonics) present in the envelope, the dotted line 22 represents the frequency emphasis in the envelope produced by filter 4, and the combination of lines 18 and 22 represents the frequency envelope of a sound as it appears at the input terminal of meter 8, i.e., at point A. Line $F_f$ represents the formant frequency and line $F_t$ indicates the spectral band which the frequency meter 8 is tracking. As the formant frequency $F_f$ shifts during the dynamics of speech, the amplitude of line $F_t$ decreases and the amplitude of the adjacent spectral line $F_t'$ increases as shown in FIG. 3*b*. As the formant frequency $F_f$ continues to vary (FIG. 3*c*), the amplitude of the adjacent spectral line $F_t'$ exceeds the amplitude of line $F_t$ at the tracking circuit input terminal. However, due to the frequency emphasis produced by filter 4, the amplitude of spectral line $F_t$ is still larger than the adjacent spectral line $F_t'$ at point A. Not until the amplitude of the adjacent spectral line $F_t'$ exceeds the amplitude of $F_t$ by a set value, for example 6db., as shown in FIG. 3*d*, will the frequency meter switch to the adjacent spectral line $F_f'$. As shown, this switch also produces a corresponding switch in the frequency band emphasized. Thus, the circuit of the present invention exhibits hysteresis which prevents the extractor from tracking insignificant formant frequency shifts. This results in the generation of a substantially noise-free formant frequency parameter signal. Even though the spectral line being tracked may vary from the formant frequency $F_f$ by almost the pitch frequency, the spectral line being tracked is always sufficiently close to the formant frequency $F_f$ to produce a high quality synthesized speech wave.

The tracking loop of FIG. 1 can be used to track formants other than the first formant of a sound by selecting the passbands of filters 2 and 4 to correspond to the frequencies of the second, third, etc. peaks in the envelope of the harmonics of the pitch frequency.

I claim:

1. In a formant frequency tracking circuit for processing an electrical input signal representative of an acoustic speech wave, said input signal including a plurality of components the respective frequencies of which are the pitch frequency of said speech wave and different harmonics of said pitch frequency, said tracking circuit comprising:

a band-pass filter having a passband inclusive of a plurality of said harmonics and supplied with and responsive to said input signal to produce an output signal;

first means responsive to a time-varying signal comprising a plurality of alternating components of respectively different frequencies and amplitudes, supplied to an input terminal of said first means, to produce a control signal representative of the frequency of that one of said alternating components which has the largest amplitude;

the improvement comprising second means, supplied with said output signal and said control signal, for supplying to said first means a composite signal including:

i. a first portion of said output signal not subjected by said second means to significant frequency selection; and ii. a second portion of said output signal subjected by said second means to frequency-selective transmission maximized by said second means, in response to said control signal, at a frequency substantially equal to that frequency represented by said control signal; and said composite signal being said time-varying signal.

2. The circuit of claim 1 wherein said second means comprises a tunable filter having an input terminal, an output terminal and a tuning control terminal, and a nonfrequency selective device in shunt with said input terminal and said output terminal of said tunable filter; said input terminal of said tunable filter being supplied with said output signal, said output terminal of said tunable filter being connected to said input terminal of said first means, and said tuning control terminal of said tunable filter being supplied with said control signal.

3. The circuit of claim 2 wherein said tunable filter comprises a tunable high pass filter and a tunable low pass filter connected in tandem.

4. The circuit of claim 3 wherein said first means comprises a limiter, a zero-crossing counter, and a low pass filter.

5. A formant frequency-tracking circuit comprising a band-pass filter, a tunable band-pass filter having a passband narrower than the passband of said band-pass filter and tunable over a substantial portion of the passband of said band-pass filter, first means for deriving a control signal proportional to the frequency of the highest amplitude component of the signal supplied thereto, and second means including said tunable band-pass filter and a nonfrequency selective path connected in shunt therewith for connecting said band-pass filter to said first means, the output of said first means being connected to said tunable band-pass filter to control the frequency to which it is tuned.